(12) United States Patent
Sato (10) Patent No.: US 11,953,809 B2
(45) Date of Patent: Apr. 9, 2024

(54) CAMERA SUPPORT STRUCTURE AND HEAD-MOUNTED DISPLAY

(71) Applicant: SONY INTERACTIVE ENTERTAINMENT INC., Tokyo (JP)

(72) Inventor: Fumihiko Sato, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 274 days.

(21) Appl. No.: 17/612,642

(22) PCT Filed: Jun. 4, 2020

(86) PCT No.: PCT/JP2020/022161
§ 371 (c)(1),
(2) Date: Nov. 19, 2021

(87) PCT Pub. No.: WO2020/250806
PCT Pub. Date: Dec. 17, 2020

(65) Prior Publication Data
US 2022/0244623 A1  Aug. 4, 2022

(30) Foreign Application Priority Data

Jun. 11, 2019 (JP) .................................. 2019-108350

(51) Int. Cl.
*G03B 17/56* (2021.01)
*G06F 1/16* (2006.01)

(52) U.S. Cl.
CPC .......... *G03B 17/561* (2013.01); *G06F 1/163* (2013.01); *G06F 1/1686* (2013.01)

(58) Field of Classification Search
None
See application file for complete search history.

(56) References Cited

U.S. PATENT DOCUMENTS

| 11,740,691 | B1* | 8/2023 | Hossain | G01C 19/5783 73/526 |
| 2010/0079356 | A1 | 4/2010 | Hoellwarth | |
| 2012/0169919 | A1* | 7/2012 | Huertos Sanz | G03B 17/561 348/373 |
| 2016/0361643 | A1* | 12/2016 | Allin | A63F 13/5255 |

(Continued)

FOREIGN PATENT DOCUMENTS

| CN | 208901043 U * | 5/2019 |
| JP | 2010204293 A | 9/2010 |

(Continued)

OTHER PUBLICATIONS

International Search Report and Written Opinion dated Sep. 8, 2020, from PCT/JP2020/022161, 9 sheets.

*Primary Examiner* — Rodney E Fuller
(74) *Attorney, Agent, or Firm* — XSENSUS LLP (57) ABSTRACT

A positional and postural accuracy of stereo cameras 30 is maintained. A camera support structure (100) includes a support frame (130) that is mounted on a housing (110) of a head-mounted display 1 and supports stereo cameras (30), and at least one rubber member (40) that is interposed between the housing (110) and the support frame (130) and has at least a portion elastically deformable between the housing (110) and the support frame (130) upon deformation or displacement of the support frame (130).

9 Claims, 7 Drawing Sheets

(56) References Cited

U.S. PATENT DOCUMENTS

2019/0149636 A1* 5/2019 Miyazaki ................ G06T 11/60
                                                      345/8
2021/0325683 A1* 10/2021 Yee ......................... G06F 3/015

FOREIGN PATENT DOCUMENTS

JP          2019116210 A  *  7/2019  ............ B29C 55/08
WO          2016199731 A1    12/2016

* cited by examiner

CAMERA SUPPORT STRUCTURE AND HEAD-MOUNTED DISPLAY

TECHNICAL FIELD

The present invention relates to a camera support structure and a head-mounted display including the camera support structure.

BACKGROUND ART

PTL 1 discloses a head-mounted display with cameras attached thereto.

CITATION LIST

Patent Literature

[PTL 1]
WO2016/199731A1

SUMMARY

Technical Problems

For cameras to be used for ranging or the like, their positional accuracy and postural accuracy are of importance. For example, if a frame that supports cameras is thermally expanded or displaced due to external forces such as shocks applied when the cameras fall, then the cameras may possibly be shifted in position or changed in posture.

An object of the present disclosure is to provide a camera support structure that maintains the positional and postural accuracy of cameras and a head-mounted display that includes the camera support structure.

Solution to Problems

An example of a camera support structure proposed by the present disclosure includes a support frame that is mounted on a housing of a head-mounted display and supports cameras, and at least one elastic member that is interposed between the housing and the support frame and has at least a portion elastically deformable between the housing and the support frame upon deformation or displacement of the support frame.

An example of a head-mounted display proposed by the present disclosure includes the camera support structure described above, the housing, a display that is housed in the housing, and a mounting band that extends from the housing.

An example of a camera support structure proposed by the present disclosure includes a support frame that is mounted on a housing and supports cameras, and an elastic member that is interposed between the housing and the support frame and has at least a portion elastically deformable between the housing and the support frame upon deformation or displacement of the support frame.

DESCRIPTION OF EMBODIMENT

An embodiment of the present invention (hereinafter, referred to as the "present embodiment") will be described hereinbelow with reference to the drawings. In the description that follows, directions indicated by X1 and X2 in the drawings refer to rightward and leftward directions, respectively, directions indicated by Y1 and Y2 in the drawings refer to forward and rearward directions, respectively, and directions indicated by Z1 and Z2 in the drawings refer to upward and downward directions, respectively. These directions represent directions as viewed by a user who is wearing a head-mounted display 1. In the description that follows, further, the head-mounted display 1 will be referred to as an HMD 1.

In the description that follows, further, components that are disposed on the right side will be denoted by a reference numeral with a suffix R, components that are disposed on the left side will be denoted by a reference numeral with a suffix L, and components that are disposed between the components indicated by the suffix R and the components indicated by the suffix L will be denoted by a reference numeral with a suffix C. The suffixes R, L, and C will be omitted from those components that are described without distinction therebetween. For example, of rubber members 40 to be described later, the rubber member disposed on the right side will be denoted by 40R. This also holds true for mounts 131, etc.

<Outline of an Overall Configuration of HMD 1>

Figure 1:
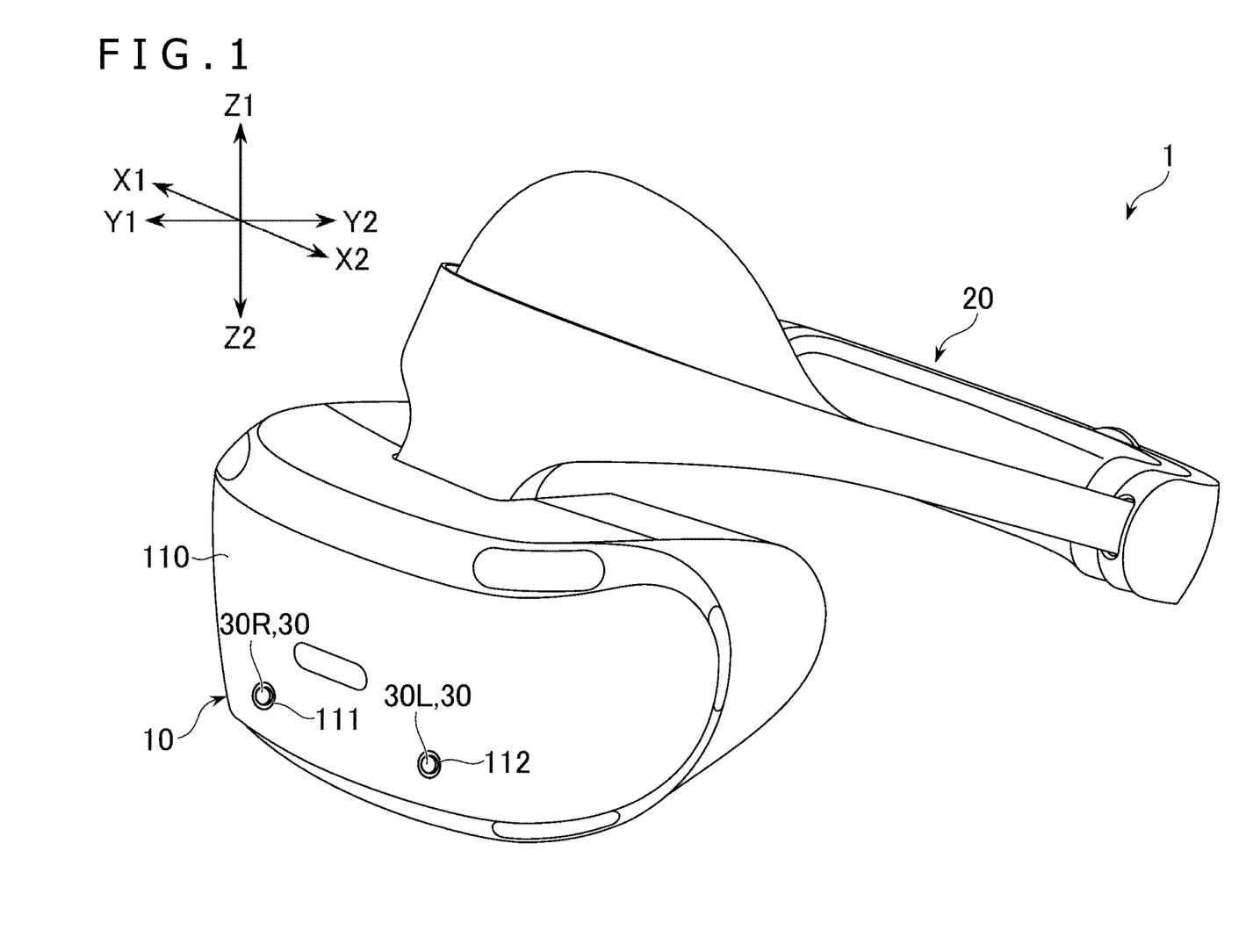
FIG. 1 is a perspective view illustrating an overall configuration of an HMD (Head Mounted Display) according to an embodiment.

FIG. 1 is a perspective view illustrating an overall configuration of an HMD according to the present embodiment. As illustrated in FIG. 1, the HMD 1 has a main device body 10 and a mounting band 20.

The mounting band 20 extends rearwardly from the main device body 10. When the HMD 1 is in use, the mounting band 20 surrounds the head of the user. The mounting band 20 is of an annular shape in which the head of the user may be placed.

The main device body 10 has at least a display 11 (see FIG. 2), a lens 12 (see FIG. 2), and a housing 110 housing the display 11 and the lens 12 therein and providing an appearance of the main device body 10. According to an example of the HMD 1, the display 11 displays three-dimensional video images. However, the display 11 may not necessarily display three-dimensional video images, and may display two-dimensional video images. The display 11 may include a liquid crystal display device or an organic electroluminescence display device, though it is not limited to any particular kinds. When the HMD 1 is in use, the main device body 10 covers the front areas of the eyes of the user. The housing 110 may be made of resin, for example.

Further, the HMD 1 has stereo cameras 30. The stereo cameras 30 include a right camera 30R and a left camera 30L. The right camera 30R and the left camera 30L are exposed from respective openings 111 and 112 defined in the housing 110 for capturing images of a forward area. The stereo cameras 30 may be, for example, cameras for SLAM (Simultaneous localization and mapping) capable of three-dimensional recognition by predicting positions and postures of the cameras, i.e., positions and postures of the HMD 1, from the captured images. The number and positions of the cameras are not limited to those illustrated.

<Camera Support Structure>

Next, referring to FIGS. 2 through 7, a camera support structure for the stereo cameras 30 (hereinafter, referred to as a "camera support structure 100") according to the present embodiment will be described below. The camera support structure 100 includes at least a support frame 130 supporting the stereo cameras 30 and rubber members 40, to be described later, interposed between the housing 110 and the support frame 130.

Figure 2:
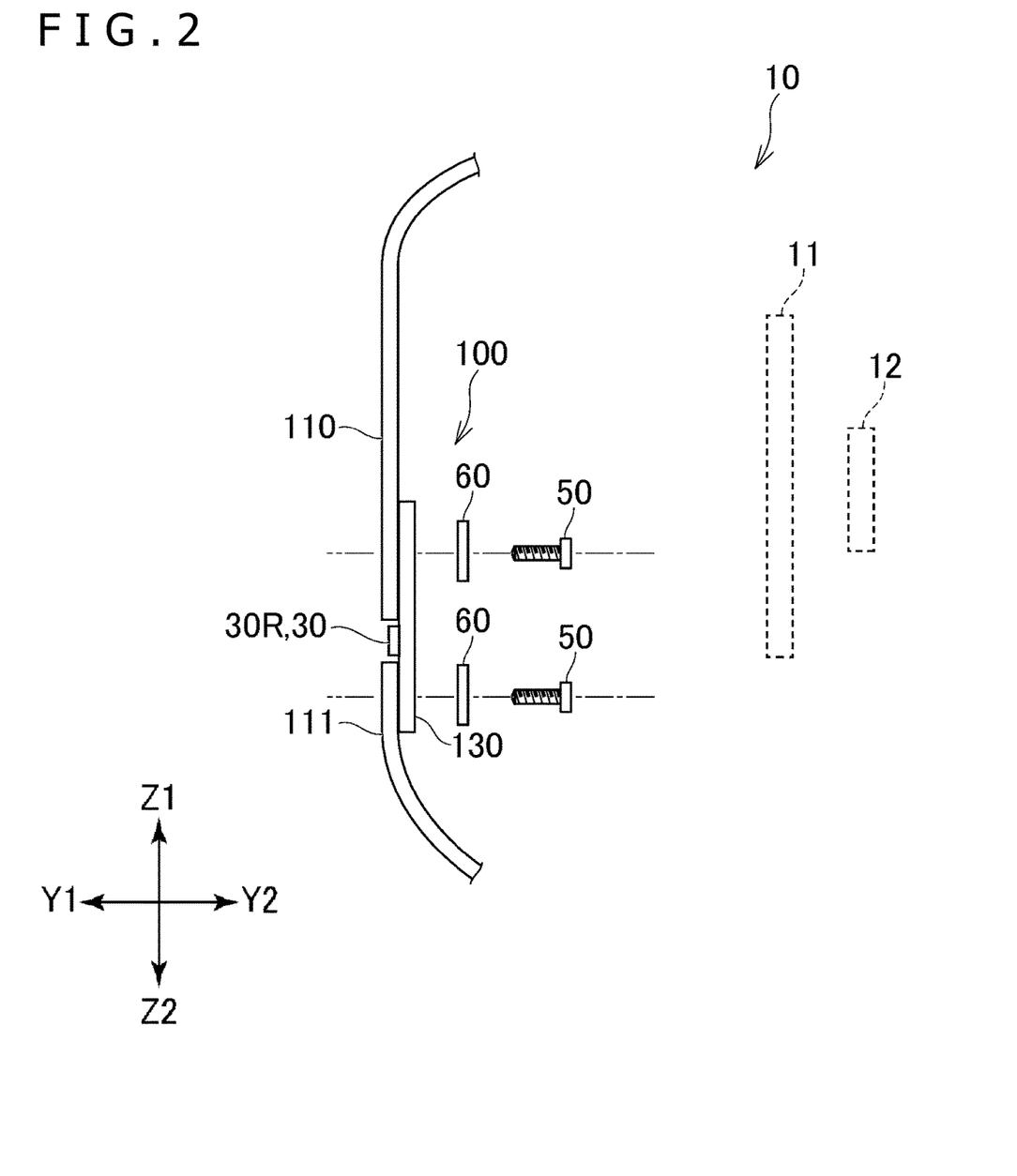
FIG. 2 is a schematic cross-sectional view of the HMD taken along a plane extending through a right camera, schematically illustrating a state before screws are tightened.
Figure 3:
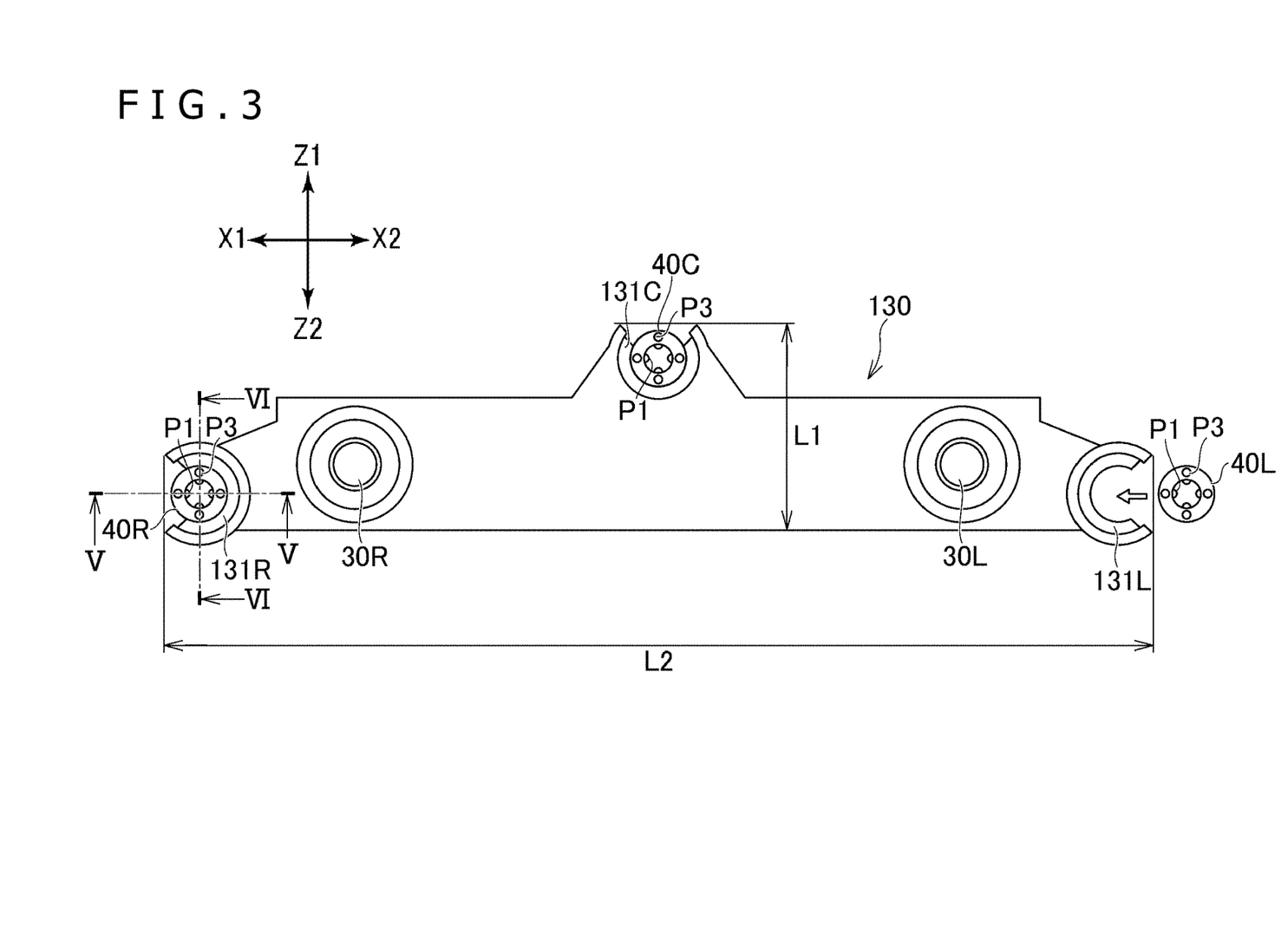
FIG. 3 is a plan view of a support frame.
Figure 4:
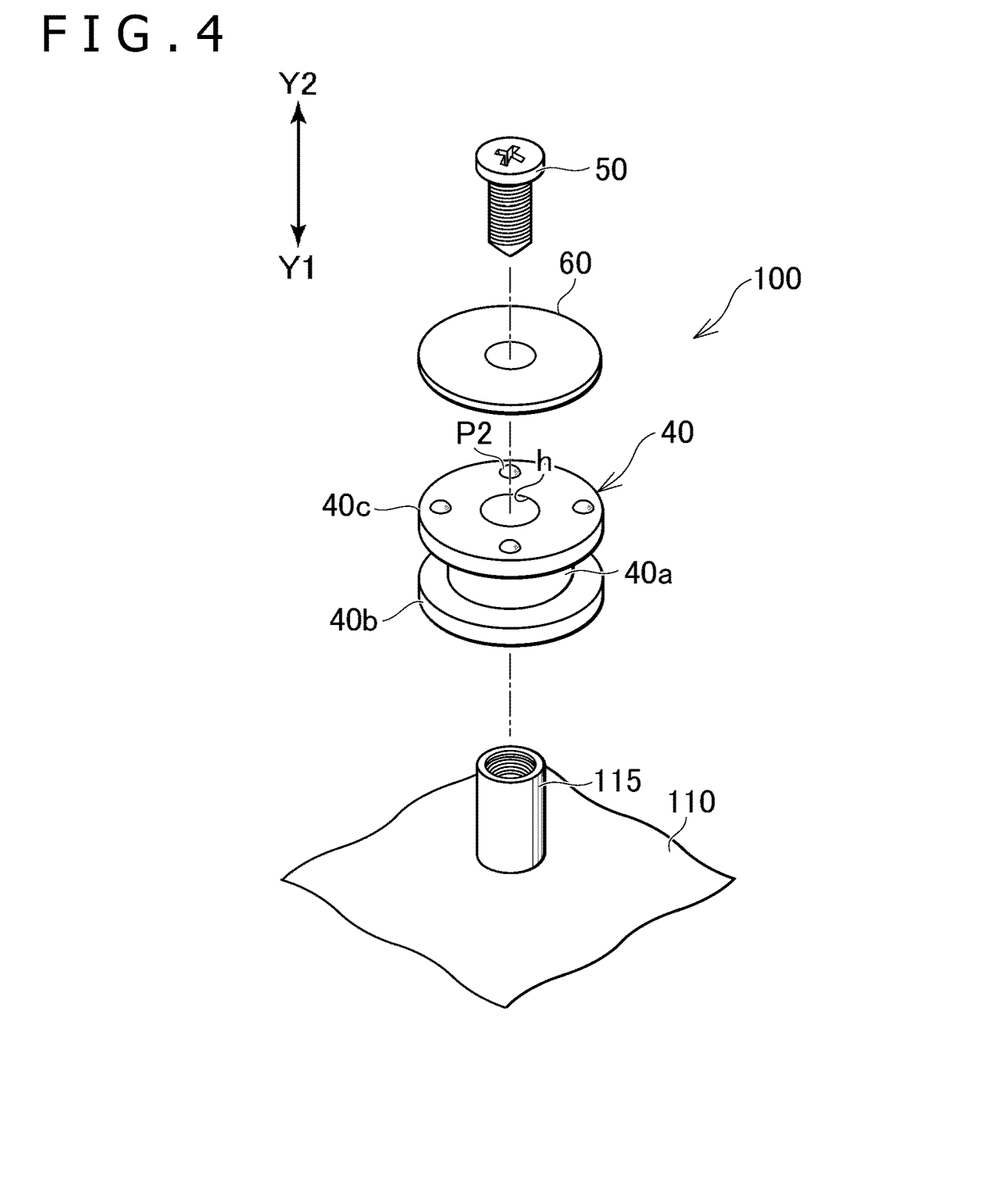
FIG. 4 is an exploded perspective view of a camera support structure.
Figure 5:
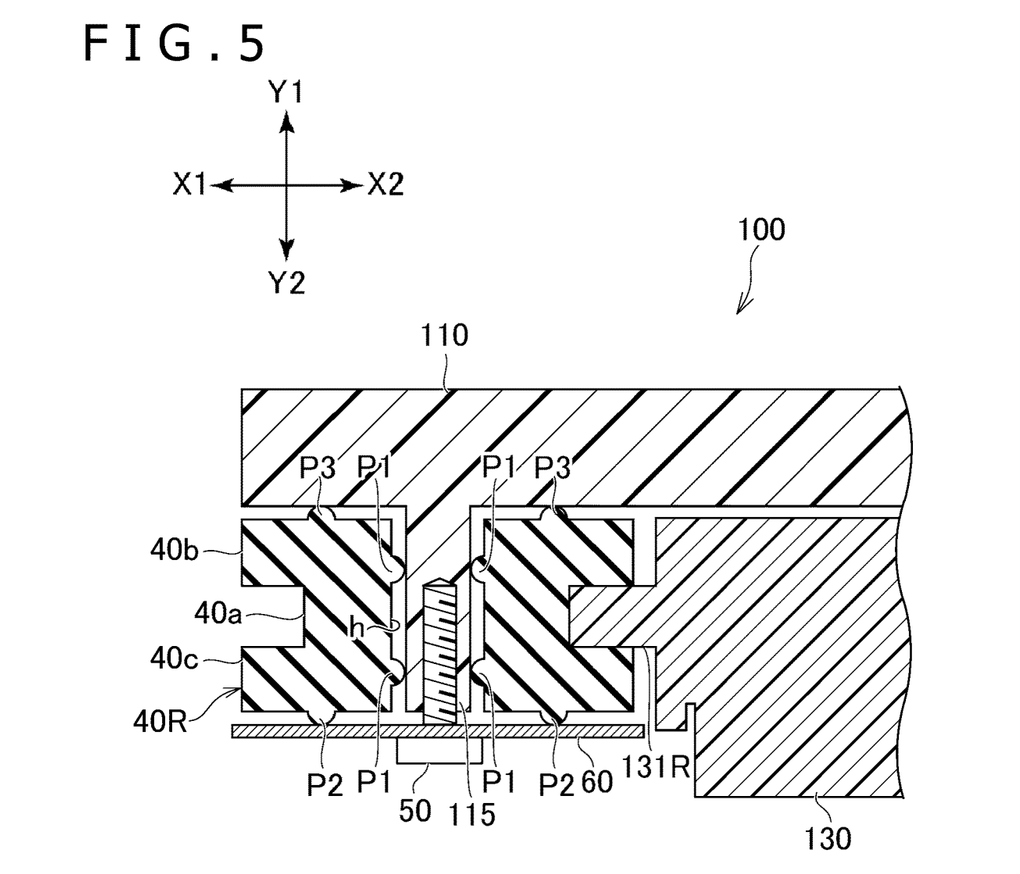
FIG. 5 is a cross-sectional view taken along line V-V of FIG. 3, illustrating a state in which the support frame is attached to a housing.
Figure 6:
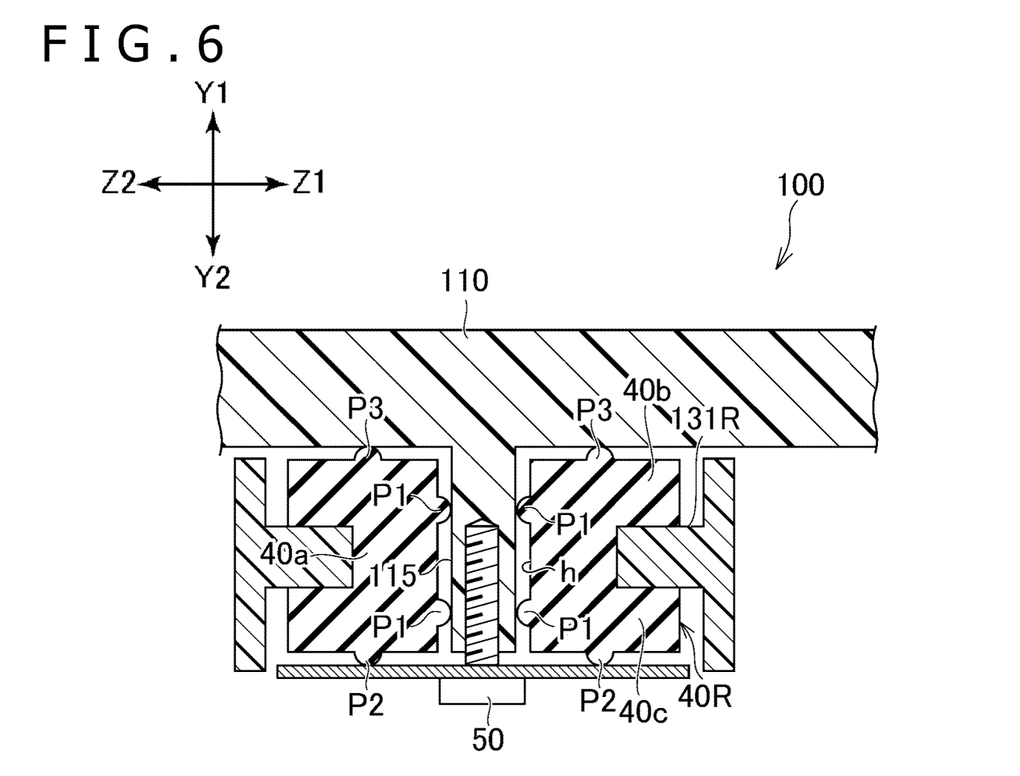
FIG. 6 is a cross-sectional view taken along line VI-VI of FIG. 3, illustrating the state in which the support frame is attached to the housing.
Figure 7:
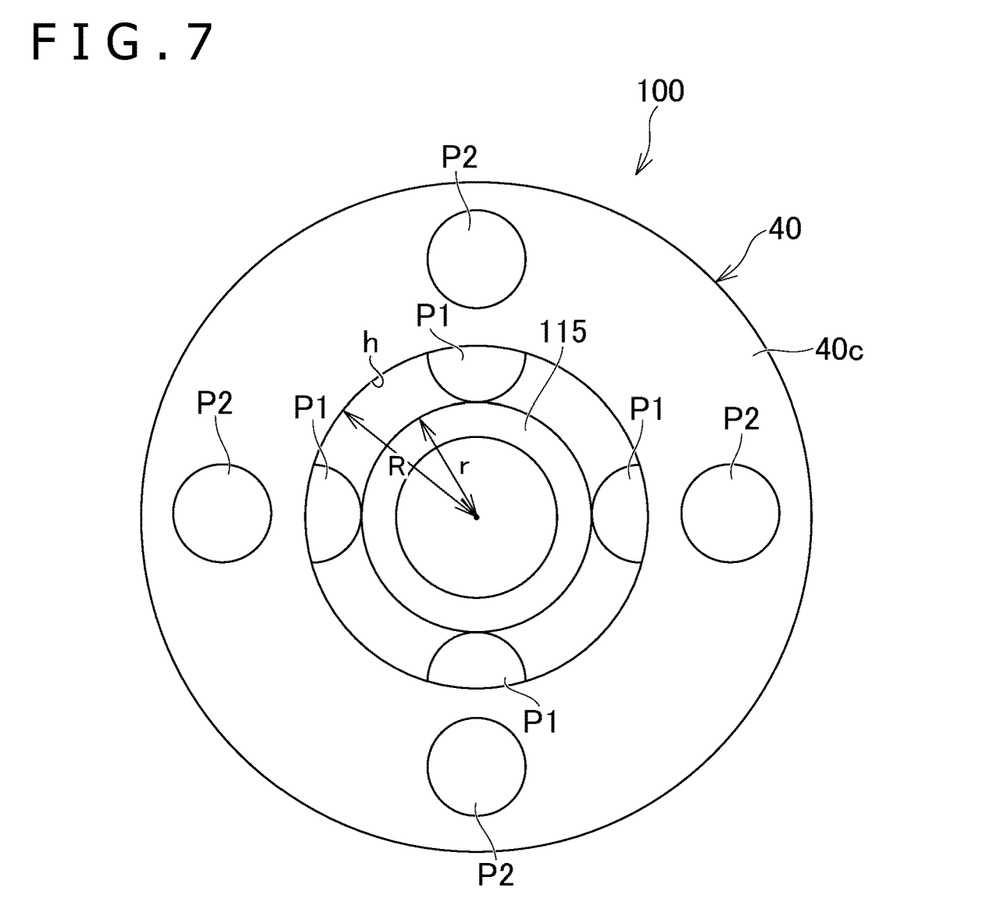
FIG. 7 is a plan view of a rubber member that is mounted on the housing.

FIG. 2 is a schematic cross-sectional view of the HMD taken along a plane extending through a right camera, schematically illustrating the state before screws are tightened. In FIG. 2, hatching is omitted from illustration. FIG. 3 is a plan view of the support frame. In FIG. 3, the near side of the sheet lies in the forward direction whereas the far side of the sheet lies in the rearward direction. FIG. 4 is an exploded perspective view of the camera support structure. In FIG. 4, the support frame 130 is omitted from illustration. FIG. 5 is a cross-sectional view taken along line V-V of FIG. 3, illustrating the state in which the support frame is attached to the housing. FIG. 6 is a cross-sectional view taken along line VI-VI of FIG. 3, illustrating the state in which the support frame is attached to the housing. FIG. 7 is a plan view of a rubber member that is mounted on the housing.

The HMD 1 has the support frame 130. The support frame 130 supports the right camera 30R and the left camera 30L thereon. The support frame 130 is mounted on a front portion of the housing 110 from behind, using screws 50. The support frame 130 may be made of resin, for example. The support frame 130 may not necessarily be mounted directly on the housing 110, and may be mounted on a frame that is fixed to the housing 110 within the housing 110.

Further, the support frame 130 is mounted on the housing 110 with the rubber members 40, i.e., elastic members, interposed therebetween. According to the present embodiment, an example in which the support frame 130 is mounted on the housing 110 with three rubber members 40R, 40L, and 40C interposed therebetween will be described below.

As illustrated in FIGS. 4 through 6, the housing 110 has posts 115 extending rearwardly and threaded internally. The housing 110 may have as many posts 115 as the number of the rubber members 40. According to the present embodiment, the housing 110 has three posts 115.

As illustrated in FIG. 4, etc., each of the rubber members 40 has a hollow cylindrical main body 40a having an insertion hole h that is defined therein and in which one of the posts 115 of the housing 110 can be inserted. The rubber member 40 also has a first flange 40b disposed on an end portion of the main body 40a with respect to the direction in which one of the screws 50 is inserted into the insertion hole h, and a second flange 40c disposed on another end portion of the main body 40a with respect to the direction in which one of the screws 50 is inserted into the insertion hole h.

As illustrated in FIG. 3, the support frame 130 is of a plate shape having a first maximum width L1 in first directions, i.e., the directions indicated by Z1 and Z2 in the illustrated example, and a second maximum width L2 in second directions, i.e., the directions indicated by X1 and X2 in the illustrated example, perpendicular to the first directions, the second maximum width L2 being larger than the first maximum width L1. In other words, the support frame 130 has longitudinal directions represented by the leftward and rightward directions. The right camera 30R and the left camera 30L are supported on the support frame 130 such that they are spaced from each other in the longitudinal directions of the support frame 130.

The planar shape of the support frame 130 illustrated in FIG. 3 and the locations where it is fastened by the screws are illustrated by way of example and not limitative.

As illustrated in FIG. 3, an arcuate mount 131R is disposed on a right portion of the support frame 130. Similarly, an arcuate mount 131L is disposed on a left portion of the support frame 130. In addition, an arcuate mount 131C is disposed on an upper portion of the support frame 130. The rubber members 40R, 40L, and 40C are fitted respectively in the mounts 131R, 131L, and 131C. More specifically, the mounts 131 are fitted between the first flanges 40b and the second flanges 40c of the rubber members 40. In this manner, the rubber members 40 are mounted on the support frame 130.

According to the present embodiment, the mounts 131 are illustrated as being of an arcuate shape where part of a circle defining an opening is broken. However, the mounts 131 are not limited to such a shape. For example, the mounts may be of a shape having an opening defined by a circle not broken. In this case, the rubber members 40 may be pressed into the openings of the mounts while being compressed.

FIG. 3 illustrates the state before the rubber member 40L is mounted on the support frame 130 on which the rubber member 40R and the rubber member 40C have been mounted.

The support frame 130 on which the rubber members 40 are mounted is mounted on the housing 110. Specifically, the posts 115 of the housing 110 are inserted respectively into the insertion holes h in the rubber members 40 mounted on the support frame 130, thereby mounting the support frame 130 on the housing 110.

With the posts 115 inserted in the insertion holes h in the rubber members 40, the screws 50 are threaded respectively into the internally threaded posts 115, thereby securing the support frame 130 to the housing 110. As illustrated in FIGS. 2, 4, etc., disk-shaped washers 60 may be disposed between the heads of the screws 50 and the second flanges 40c of the rubber members 40.

According to the present embodiment, further, each of the rubber members 40 has protrusions P1 on an inner peripheral surface that defines the insertion hole h. The protrusions P1 protrude from the inner peripheral surface that defines the insertion hole h, to come into contact with an outer peripheral surface of the post 115 of the housing 110. According to the present embodiment, there is illustrated an example in which four protrusions P1 are arrayed in circumferential directions of the insertion hole h on one side with respect to the directions in which the insertion hole h extends and four protrusions P1 are arrayed in the circumferential directions of the insertion hole h on the other side with respect to the directions in which the insertion hole h extends. In other words, the illustrated example includes eight protrusions P1 on the inner peripheral surface that defines the insertion hole h. However, the number and layout of the protrusions P1 are not limitative. In the illustrated example, further, the rubber members 40 are illustrated as mounted on the support frame 130 such that the protrusions P1 can protrude in the leftward and rightward directions and the upward and downward directions. However, the rubber members 40 may not necessarily be mounted as illustrated. The rubber members 40 may be mounted on the support frame 130 in such a posture that the protrusions P1 protrude in other directions.

As illustrated in FIG. 7, the inner peripheral surface that defines the insertion hole h has a radius R that may be slightly larger than a radius r of the outer peripheral surface of the post 115. Specifically, the radius R may be larger than the radius r to the extent that the protrusions P1 simply touch the outer peripheral surface of the post 115.

The protrusions P1 may be elastically deformable between the housing 110 and the support frame 130 upon deformation or displacement of the support frame 130. Specifically, the protrusions P1 may be elastically deformable between the outer peripheral surfaces of the posts 115 of the housing 110 and the mounts 131 of the support frame 130 upon deformation or displacement of the support frame 130.

Deformation of the support frame 130 refers to thermal expansion due to heat generated by a circuit board or the like housed in the housing 110, for example. Displacement of the support frame 130 is caused by shocks applied when the HMD 1 falls, for example.

When the support frame 130 is thermally expanded, the support frame 130 tends to warp in the longitudinal directions thereof, orienting the stereo cameras 30 outwardly in the leftward and rightward directions. The support frame 130 is liable to be deformed so as to spread particularly in the longitudinal directions i.e., the directions indicated by X1 and X2, due to thermal expansion. In other words, according to the example illustrated in FIG. 5, the support frame 130 is liable to be deformed in shape so as to spread in the rightward direction, i.e., the direction indicated by X1.

With the arrangement according to the present embodiment, when the support frame 130 is thermally expanded, the mounts 131 of the support frame 130 press the rubber members 40 in the rightward direction, i.e., the direction indicated by X1. The protrusions P1 of the rubber members 40 are thus pressed against the posts 115 and compressed.

Therefore, when the support frame 130 is thermally expanded and deformed so as to spread in the longitudinal directions, since the protrusions P1 of the rubber members 40 allow the support frame 130 to be thus deformed, the support frame 130 is unlikely to warp. As a result, the stereo cameras 30 are restrained from being shifted in orientation, making it possible to keep the accuracy of ranging with the stereo cameras 30.

Further, the housing 110 may similarly be deformed in shape due to thermal expansion. For example, in a case where the housing 110 is deformed in shape so as to spread in the direction indicated by X1 in FIG. 5, the post 115 is displaced in position in the rightward direction, i.e., the direction indicated by X1. When the housing 110 is thus thermally expanded, the post 115 presses the rubber member 40 in the rightward direction, i.e., the direction indicated by X1. The protrusions P1 of the rubber member 40 are thereby compressed. In this fashion, when the housing 110 is thermally expanded, the protrusions P1 of the rubber members 40 allow the housing 110 to be deformed, restraining the support frame 130 from being affected by the deformation of the housing 110. As a result, the positional and postural accuracy of the stereo cameras 30 is maintained, making it possible to keep the accuracy of ranging with the stereo cameras 30.

According to the present embodiment, further, the support frame 130 may be made of resin, as described above. Consequently, it is possible to make the camera support structure lightweight and reduce its cost compared with a case where the support frame 130 is made of metal. Yet, the support frame 130 may be made of metal.

According to the present embodiment, further, each of the rubber members 40 has protrusions P2 on the second flange 40c. The protrusions P2 protrude to come into contact with the washer 60 in a direction opposite the direction in which the screw 50 is inserted. The rubber member 40 also has protrusions P3 on the first flange 40b. The protrusions P3 protrude to come into contact with an area of the housing 110 around the post 115 in the direction in which the screw 50 is inserted. According to the present embodiment, there is illustrated an example in which the rubber member has four protrusions P2 and four protrusions P3. However, the numbers and layouts of the protrusions P2 and the protrusions P3 are not limitative.

The protrusions P2 and the protrusions P3 may be elastically deformable upon deformation or displacement of the support frame 130 in its thicknesswise directions, i.e., the directions indicated by Y1 and Y2. With this arrangement, in a case where external forces such as shocks are produced when the HMD falls, the protrusions P2 and the protrusions P3 absorb the shocks, restraining the support frame 130 from being positionally shifted. Likewise, the protrusions P1 absorb the shocks produced when the HMD falls. As a result, the support frame 130 is restrained from being positionally shifted in the longitudinal directions thereof. By thus restraining the support frame 130 from being positionally shifted, the positional and postural accuracy of the stereo cameras 30 is maintained, making it possible to keep the accuracy of ranging with the stereo cameras 30.

According to the present embodiment, the rubber members 40 are illustrated as elastic members. However, the rubber members 40 are not limitative. Elastic members used may have at least a portion elastically deformable between the housing 110 and the support frame 130. According to the present embodiment, the rubber members 40 with the protrusions P1 are illustrated. However, the rubber members 40 with the protrusions P1 are not limitative. The main body 40a itself that is free of the protrusions P1 may be elastically deformable between the housing 110 and the support frame 130.

According to the present embodiment, further, there is illustrated an example in which the camera support structure has three rubber members 40. However, the three rubber members 40 are not limitative. The camera support structure may have one or more rubber members 40. For example, in a case where there is one rubber member 40, the rubber member 40 may be interposed between the support frame 130 and the housing 110 in the vicinity of the center of the support frame 130.

According to the present embodiment, further, the stereo cameras 30 including a pair of cameras are illustrated. However, cameras supported on the support frame 130 are not limited to stereo cameras. Further, another camera in addition to the stereo cameras may be supported on the support frame 130.

The arrangement illustrated in the present embodiment is particularly effective for use as the HMD 1 where the circuit board with electronic parts mounted thereon consumes large electric power. In other words, the arrangement illustrated in the present embodiment is effective for use as the HMD 1 where the internal temperature is liable to rise. Specifically, it is effective for use as the HMD 1 that incorporates a wireless communication technology causing large electric power consumption, for example.

According to the present embodiment, the HMD 1 has been described by way of example. However, the HMD 1 is not limitative, and the present invention is applicable to any devices that are required to maintain the positional and postural accuracy of cameras. For example, the camera support structure 100 may be applied to unmanned aircraft such as drones. In this case, the unmanned aircraft may have a housing including internally threaded posts, and the posts may be inserted in the insertion holes h in the rubber members 40.

The invention claimed is:

1. A camera support structure comprising:
a support frame that is mounted on a housing of a head-mounted display and supports cameras; and
at least one elastic member that is interposed between the housing and the support frame and has at least a portion elastically deformable between the housing and the support frame upon deformation or displacement of the support frame,
wherein the support frame is of a plate shape having a first maximum width in first directions and a second maximum width in second directions transverse to the first directions, the second maximum width being larger than the first maximum width,
wherein the portion of the elastic member is elastically deformable upon deformation or displacement of the support frame in at least the second directions, and
wherein the portion of the elastic member includes a protrusion elastically deformable upon deformation or displacement of the support frame in the second directions.

2. The camera support structure according to claim 1, wherein
the elastic member has an insertion hole that is defined in the elastic member and in which a post on the housing is inserted, and
the protrusion is disposed on an inner peripheral surface that defines the insertion hole and held in contact with an outer peripheral surface of the post.

3. The camera support structure according to claim 1, wherein
the elastic member includes a hollow cylindrical main body with the insertion hole defined in the main body, a first flange disposed on an end portion of the main body with respect to a direction in which the insertion hole extends, and a second flange disposed on another end portion of the main body with respect to the direction in which the insertion hole extends,
the support frame has an arcuate mount, and
the elastic member is mounted on the support frame with the mount being fitted between the first flange and the second flange.

4. The camera support structure according to claim 1, wherein
the cameras include stereo cameras including a first camera and a second camera that are spaced from each other in the second directions.

5. The camera support structure according to claim 1, wherein the at least one elastic member includes a first elastic member and a second elastic member that are spaced from each other in the second directions.

6. The camera support structure according to claim 5, wherein
the at least one elastic member further includes a third elastic member disposed between the first elastic member and the second elastic member in the second directions.

7. The camera support structure according to claim 1, wherein
the support frame is made of resin.

8. A head-mounted display comprising:
a camera support structure that includes a support frame that is mounted on a housing of a head-mounted display and supports cameras, and at least one elastic member that is interposed between the housing and the support frame and has at least a portion elastically deformable between the housing and the support frame upon deformation or displacement of the support frame,
the housing;
a display that is housed in the housing; and
a mounting band that extends from the housing,
wherein the support frame is of a plate shape having a first maximum width in first directions and a second maximum width in second directions transverse to the first directions, the second maximum width being larger than the first maximum width,
wherein the portion of the elastic member is elastically deformable upon deformation or displacement of the support frame in at least the second directions, and
wherein the portion of the elastic member includes a protrusion elastically deformable upon deformation or displacement of the support frame in the second directions.

9. A camera support structure comprising:
a support frame that is mounted on a housing and supports cameras; and
an elastic member that is interposed between the housing and the support frame and has at least a portion elastically deformable between the housing and the support frame upon deformation or displacement of the support frame,
wherein the support frame is of a plate shape having a first maximum width in first directions and a second maximum width in second directions transverse to the first directions, the second maximum width being larger than the first maximum width,
wherein the portion of the elastic member is elastically deformable upon deformation or displacement of the support frame in at least the second directions, and
wherein the portion of the elastic member includes a protrusion elastically deformable upon deformation or displacement of the support frame in the second directions.

* * * * *